US012582951B2

(12) United States Patent
Broussard

(10) Patent No.: US 12,582,951 B2
(45) Date of Patent: Mar. 24, 2026

(54) DEVICES AND METHODS FOR MIXING LIQUIDS BY MOVING SAID LIQUIDS BACK AND FORTH BETWEEN A PUMP AND A MEASURING CELL, AND PHYSICOCHEMICAL ANALYSIS OF THE LIQUIDS MIXED IN THIS MANNER

(71) Applicant: COMMISSARIAT A L'ENERGIE ATOMIQUE ET AUX ENERGIES ALTERNATIVES, Paris (FR)

(72) Inventor: Sylvain Broussard, Laudun (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 555 days.

(21) Appl. No.: 17/788,190

(22) PCT Filed: Dec. 14, 2020

(86) PCT No.: PCT/FR2020/052407
§ 371 (c)(1),
(2) Date: Jun. 22, 2022

(87) PCT Pub. No.: WO2021/130424
PCT Pub. Date: Jul. 1, 2021

(65) Prior Publication Data
US 2023/0022972 A1      Jan. 26, 2023

(30) Foreign Application Priority Data
Dec. 23, 2019    (FR) ...................................... 19 15424

(51) Int. Cl.
*G01N 30/00*        (2006.01)
*B01F 33/84*        (2022.01)
(Continued)

(52) U.S. Cl.
CPC .......... *B01F 33/84* (2022.01); *B01F 35/7174* (2022.01); *G01N 30/34* (2013.01);
(Continued)

(58) Field of Classification Search
CPC ............................................. G01N 2021/0193
See application file for complete search history.

(56) References Cited

U.S. PATENT DOCUMENTS 6,096,274 A * 8/2000 Hoogendijk ....... G01N 35/1097
436/51
2011/0016955 A1    1/2011 Cormier
(Continued)

FOREIGN PATENT DOCUMENTS

CN       101405595      *  4/2009
CN       107422136 A     12/2017
(Continued)

OTHER PUBLICATIONS

International Search Report issued Mar. 26, 2021 in PCT/FR2020/052407, filed on Dec. 14, 2020, 3 pages.
(Continued)

*Primary Examiner* — John E Breene
*Assistant Examiner* — Alex T Devito
(74) *Attorney, Agent, or Firm* — Oblon, McClelland, Maier & Neustadt, L.L.P.

(57) ABSTRACT

A microfluidic device and a method for mixing liquids by moving the liquids back-and-forth between a chamber of a piston pump and a cavity of a spectrophotometric measuring cell. The disclosure also relates to physicochemical analysis of a mixture directly within the microfluidic device wherein the mixture is obtained using the method described herein. The disclosure also relates to a device and a method for sampling liquids remotely.

9 Claims, 3 Drawing Sheets

(51) Int. Cl.

| | | |
|---|---|---|
| B01F 35/71 | (2022.01) | |
| G01N 30/34 | (2006.01) | |
| G01N 30/74 | (2006.01) | |
| G05D 11/00 | (2006.01) | |
| *G01N 21/01* | (2006.01) | |
| *G01N 30/20* | (2006.01) | |

(52) U.S. Cl.

CPC ........... *G01N 30/74* (2013.01); *G05D 11/001* (2013.01); *G01N 2021/0193* (2013.01); *G01N 2030/201* (2013.01); *G01N 2030/202* (2013.01); *G01N 2030/347* (2013.01)

(56) References Cited

U.S. PATENT DOCUMENTS

| | | |
|---|---|---|
| 2011/0186511 A1 | 8/2011 | Sakai et al. |
| 2013/0327692 A1 | 12/2013 | Brann |
| 2016/0153942 A1 | 6/2016 | Yotani et al. |
| 2016/0236114 A1 | 8/2016 | Brann |
| 2017/0285051 A1 | 10/2017 | Littmann et al. |
| 2018/0340916 A1 | 11/2018 | Song et al. |

| | | |
|---|---|---|
| 2019/0331707 A1 | 10/2019 | Gu et al. |
| 2020/0240960 A1 | 7/2020 | Song et al. |

FOREIGN PATENT DOCUMENTS

| | | |
|---|---|---|
| CN | 110382115 A | 10/2019 |
| EP | 0 183 950 A1 | 6/1986 |
| EP | 2 345 896 A1 | 7/2011 |
| EP | 3 023 782 A1 | 5/2016 |
| JP | 2005-518532 A | 6/2005 |
| JP | 2019-191181 A | 10/2019 |
| WO | WO 03/072253 A1 | 9/2003 |
| WO | WO 2009/111229 A2 | 9/2009 |
| WO | WO 2012/058516 A1 | 5/2012 |
| WO | WO 2018/138023 A1 | 8/2018 |

OTHER PUBLICATIONS

French Preliminary Search report issued Sep. 7, 2020 in French Application 19 15424, filed on Dec. 23, 2019, 2 pages (with English Translation of Categories of Cited Documents).
Office Action issued Aug. 13, 2024, in corresponding Japanese Patent Application No. 2022-538846, 5 pages.

* cited by examiner

DEVICES AND METHODS FOR MIXING LIQUIDS BY MOVING SAID LIQUIDS BACK AND FORTH BETWEEN A PUMP AND A MEASURING CELL, AND PHYSICOCHEMICAL ANALYSIS OF THE LIQUIDS MIXED IN THIS MANNER

TECHNICAL FIELD

The invention relates to the field of devices and methods for sampling and mixing liquids. The invention is of particular interest in the field of analytical chemistry, in particular for the preparation of solutions to be analysed.

The invention is not limited to this particular field of application. It could be implemented in all industrial and scientific research fields.

PRIOR ART

The physicochemical analysis of a liquid generally requires mixing this liquid with reagents beforehand.

A conventional analysis technique, called sequential injection, consists in injecting a sample of the liquid and the reagents within a circuit filled with a carrier liquid. The injection is carried out using a syringe pump, by making these products flow through a helical mixing tube. Afterwards, the solution thus mixed is ejected, using the pump, towards a passing spectrophotometric cell within which a spectral analysis is carried out continuously.

In comparison with a conventional analysis on the bench, this technique allows reducing the volume of the analysed samples (about 10 µL per sample vs. about 5 mL on the bench), reducing the volume of the generated effluents (about 1.5 mL per analysed sample vs. about 60 mL on the bench), and reducing the analysis time (about 2 min 30 sec per sample vs. more than 20 min on the bench).

Nonetheless, this technique has drawbacks.

On the one hand, the mixing within the helical tube produces an inhomogeneous solution.

On the other hand, the configuration of the spectrophotometric cell allows carrying out only temporal measurements.

Furthermore, the unused portion of the sample cannot be recovered for a subsequent analysis because the sample is completely mixed with the carrier liquid.

DISCLOSURE OF THE INVENTION

The invention is intended to provide devices and methods capable of improving the homogeneity of the mixture, providing a mixture adapted to be analysed during an independent, non-temporal analysis step, and further reducing the volume of generated effluents.

The invention is also intended to increase the automation of the analysis process. Indeed, the automation allows reducing the sources of error in the measurements and increasing the analysis rate.

The invention is also intended to enable sampling at a considerable distance of a reduced volume of a liquid sample.

To this end, an object of the invention is a device for mixing liquids, this device comprising a piston pump, a multi-way valve, a recipient, a first duct for connecting the valve to a chamber of the pump, a second duct for connecting a cavity of the recipient to a transfer way of the valve, several inlet ducts each connected to a respective inlet way of the valve, the valve being able to selectively occupy:

sampling positions each establishing a fluidic communication between a respective one of said inlet ducts and the chamber so as to be able to move a respective one of said liquids from this inlet duct towards the chamber by the action of a movement of said piston in a first direction, a transfer position establishing a fluidic communication between the chamber and the cavity so as to be able to move said liquids, via the first and the second connection duct, from the chamber to the cavity by the action of a movement of the piston in a second direction and from the cavity to the chamber by the action of a movement of the piston in said first direction.

According to the invention, at least in one use configuration of this device, the cavity defines a low point and said second connection duct is connected to the recipient so as to be able to introduce into the cavity or extract therefrom said liquids through this low point.

The concepts of "low point" and "high point" should be understood as commonly accepted in fluid mechanics. Thus, the low point of the cavity is the lowest point of the cavity when the device is in said use configuration, i.e. in a configuration enabling a movement of the liquids from the chamber to the cavity by the action of a movement of the piston in the second direction and from the cavity to the chamber by the action of a movement of the piston in said first direction, when the valve is in the transfer position.

Positioning the second connection duct at the low point of the cavity allows extracting through this duct most if not all of the liquids contained in the cavity.

Thus, it is possible to carry out a mixing step by recirculating the liquids in the device after initial introduction thereof into the cavity. More specifically, this mixing step comprises at least one movement of the liquids from the cavity to the chamber and then from the chamber to the cavity, i.e. at least one back-and-forth movement of the liquids between the cavity and the chamber.

During such a mixing step, the liquids are subjected to stresses resulting from the section changes between the cavity, the ducts and the chamber. Indeed, the ducts have a section smaller than the section of the cavity and that of the chamber, for example a section about ten times smaller.

In the context of tests in which this device has been used to mix aqueous solutions for spectrophotometric analysis, it has been surprisingly found that one or two round trip(s) of the liquids between the cavity and the chamber allow obtaining a homogeneous solution that could provide measurement results having both very low standard deviation and bias.

The invention allows improving and automating both mixing of the liquids and rinsing of the device while simplifying the device.

Positioning the second connection duct at the low point of the cavity allows automating rinsing of the device and in particular of the cavity of the recipient, by introduction of a rinsing liquid into the device, via one of the inlet ducts.

It has also been observed during the aforementioned tests that the effectiveness of such rinsing in terms of elimination of traces that might affect a new measurement.

Thus, the invention allows automating most of the steps including the rinsing of the device and allows obtaining a homogeneous mixture of liquids in a rapid, reliable and simple manner, in particular without resorting to a mechanical mixing device such as a magnetic stirrer, a vibrating plate or a pump stirring mechanism.

Preferably, the cavity may be open at one end of the recipient opposite to the low point.

Thus, the cavity could be exposed to a surrounding pressure such as atmospheric pressure.

In particular, this allows avoiding depression or overpressure phenomena in the cavity and the fluidic circuit during the implementation of the device.

In one embodiment, the cavity may have a section narrowing towards the low point.

Such a narrowing of the cavity allows avoiding the retention of liquid in the cavity, improving the mixing of the liquids during extraction thereof from the cavity through the second connection duct and improving the efficiency of rinsing of the cavity.

When the recipient is a spectrophotometric measuring cell, such a narrowing of the cavity also allows reducing the volume of this cell while defining enough height to carry out a suitable spectrophotometric measurement.

Preferably, at least when the device is in said use configuration, the chamber may define a low point and said first connection duct may be connected to the pump so as to be able to introduce into the chamber or extract therefrom said liquids through this low point.

Thus, when both air and liquids are introduced into the chamber, the air could rise in the chamber against the piston whereas the liquids could occupy a space located vertically between the volume of air and the low point of the chamber.

When the piston is moved in the second direction, the air present in the chamber pushes the liquids out of the chamber, which allows in particular moving all of these liquids up to the cavity of the recipient and possibly injecting air bubbles in the liquids present in the cavity. To this end, the device may be dimensioned so that, when all of the liquids coming from the chamber have been introduced into the cavity of the recipient, a residual amount of air is still present in the chamber, causing the formation of air bubbles in the liquids within the cavity at the end of the stroke of the piston.

The recipient may be a recipient used solely for mixing the liquids or used both for mixing and analysing them. In other words, the recipient may form a measuring cell.

In a preferred embodiment, the recipient may be a spectrophotometric measuring cell.

Of course, the mixing device is compatible with other detection techniques such as colorimetry, atomic absorption spectrometry, inductively coupled mass spectrometry, refractometry, chemiluminescence or else electrochemistry.

Preferably, the mixing device defined hereinabove is a microfluidic device.

In one embodiment, said valve to which reference is made hereinabove may be a main valve and the mixing device may comprise a sampling device comprising a sampling valve and a sampling duct connected to a sampling way of the sampling valve. Preferably, the sampling valve may selectively occupy:

a liquid sampling position establishing a fluidic communication between the sampling duct and a first one of said inlet ducts so as to be able to move the liquid from the sampling duct towards the chamber by the action of a movement of the piston in the first direction when the main valve is in a first sampling position establishing a fluidic communication between said first inlet duct and the chamber, an air sampling position establishing a fluidic communication between an open way of the sampling valve and said first inlet duct, said open way being exposed to the surrounding air, so as to be able to move surrounding air towards the chamber by the action of a movement of said piston in a first direction when the main valve is in said first sampling position.

Such a sampling device allows sampling a relatively small volume of liquid at a relatively large distance, by conveying this volume of liquid between two volumes of air sampled via said open way.

Besides the context of the present invention, the sampling device could be associated with a device different from the mixing device described hereinabove.

The invention also relates to a device for the physico-chemical analysis of a liquid, this analysis device comprising a mixing device as defined hereinabove.

This analysis device may comprise a system implementing either one of the aforementioned detection techniques.

Thus, the analysis device may for example comprise a spectrophotometric detector.

According to another aspect, an object of the invention is a method for mixing liquids using a mixing device as defined hereinabove, this method comprising:

a sampling step in which said liquids are respectively moved from said inlet ducts towards the chamber of the pump, this step comprising positioning the valve in said respective sampling positions, a step of filling the recipient comprising moving at least part of the liquids from the chamber to the cavity, this step comprising positioning the valve in said transfer position, a mixing step comprising moving at least part of the liquids from the cavity to the chamber then from the chamber to the cavity.

This mixing method confers the same advantages as those indicated hereinabove with reference to the mixing device.

The invention also relates to a method for the physico-chemical analysis of a liquid using an analysis device as defined hereinabove, this analysis method including a mixing method as defined hereinabove.

Other advantages and features of the invention will appear upon reading the following detailed non-limiting description.

BRIEF DESCRIPTION OF THE DRAWINGS

The following detailed description refers to the appended drawings wherein.

DETAILED DESCRIPTION OF SOME EMBODIMENTS

Figure 1:
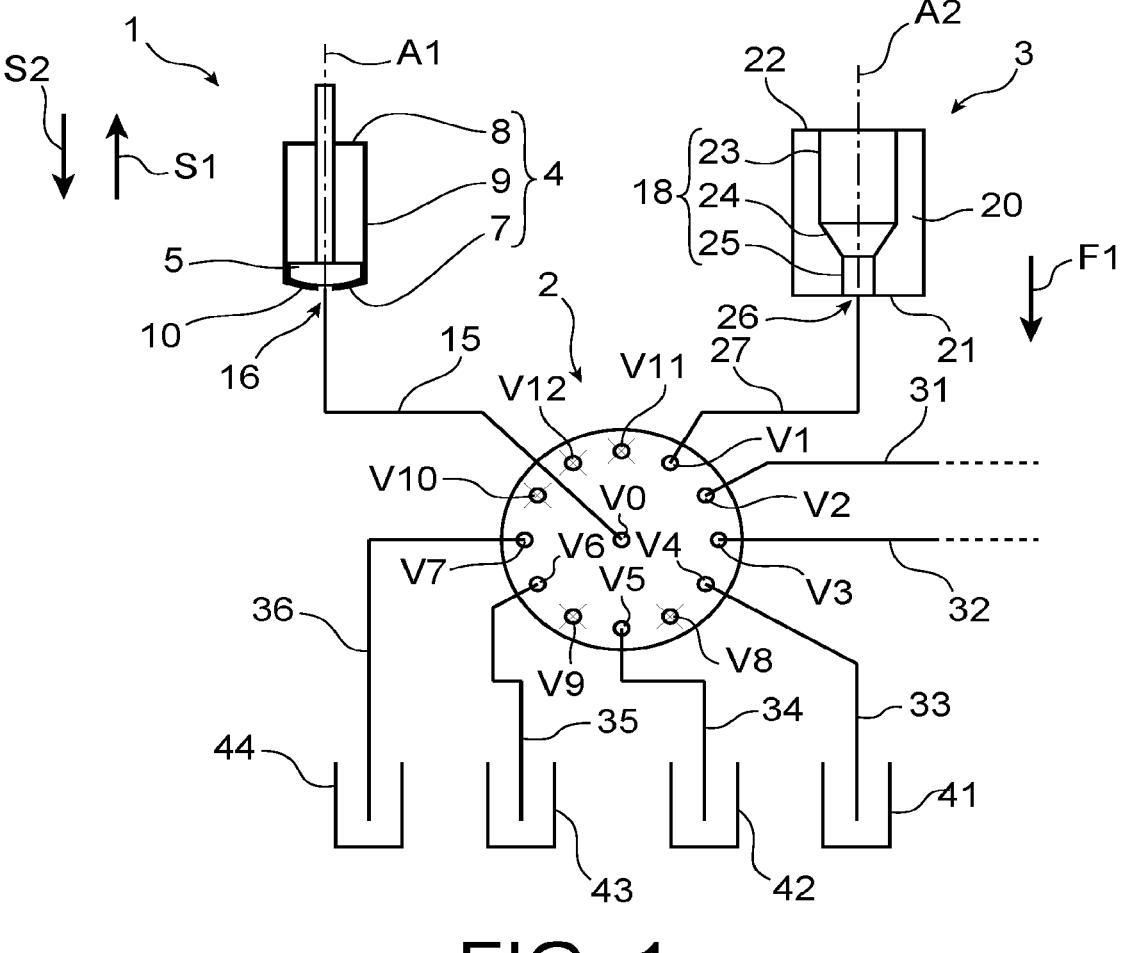
FIG. 1 is a schematic view of a mixing device in accordance with the invention, comprising a piston pump, the piston being in a first position.
Figure 2:
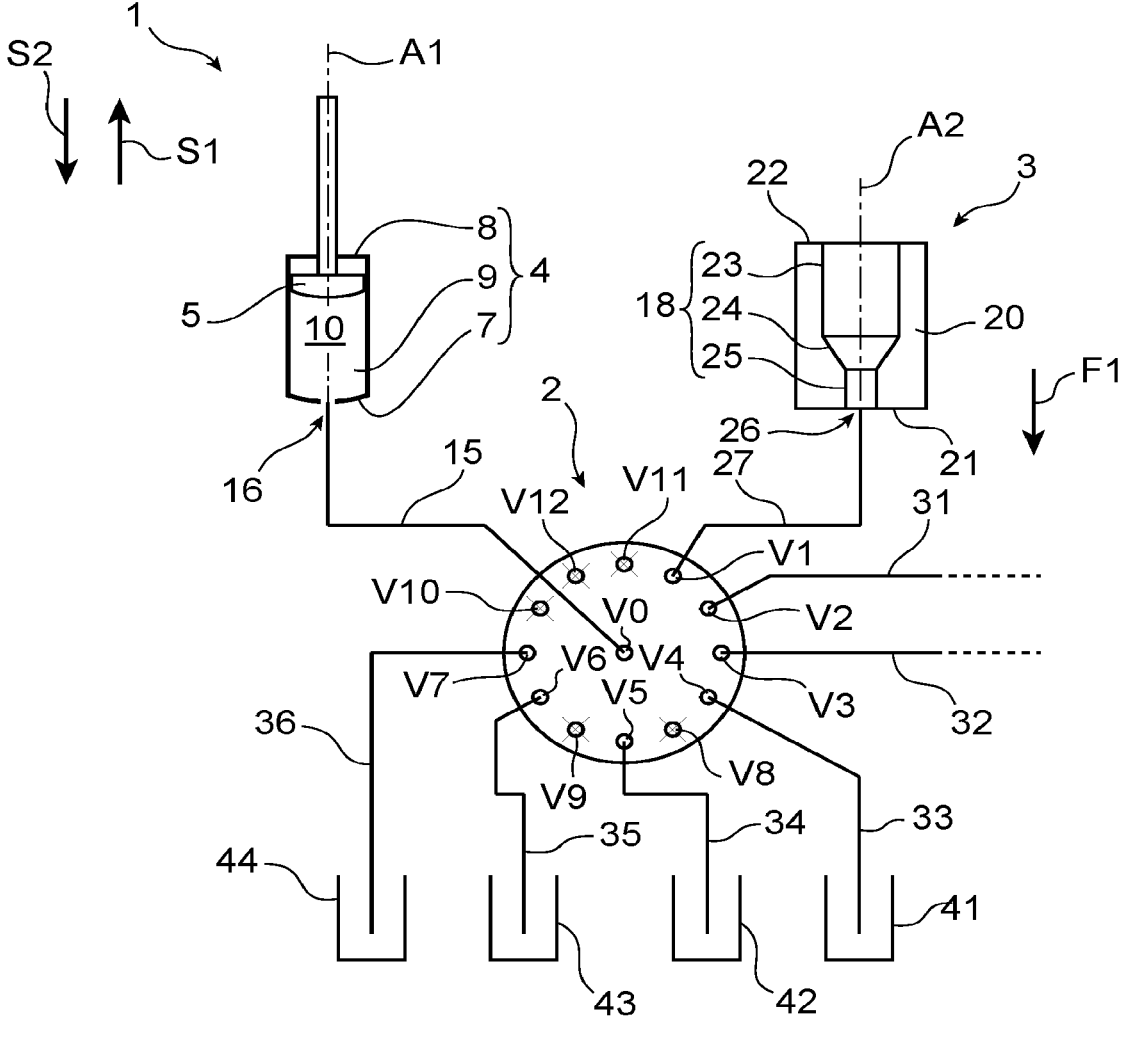
FIG. 2 is a schematic view of the device of FIG. 1, the piston of the pump being in a second position.

In FIGS. 1 and 2, a device in accordance with the invention is represented in a schematic and simplified manner.

This device comprises a pump 1, a valve 2 and a recipient 3 interconnected so as to be able to move and mix liquids therein.

The pump 1 comprises a body 4 and a piston 5.

In this example, the body 4 forms a cylindrical housing extending along a longitudinal axis A1 along which the piston 5 could slide.

In FIGS. 1 and 2, the device is in a so-called use configuration.

In this use configuration, the longitudinal axis A1 is substantially parallel to the vertical, i.e. to the direction along which the force of gravity F1 is exerted.

The body 4 of the pump 1 comprises a vertically lower end 7, a vertically upper end 8 and a lateral wall 9 connecting the lower end 7 and the upper end 8 to each other.

The expressions "lower" and "upper", or "vertically lower" and "vertically upper" are defined with respect to the orientation of the force of gravity F1. Thus, when an element comprises a lower portion and an upper portion, a liquid subjected to the force of gravity F1 tends to move by the action of this force in a direction from the upper portion towards the lower portion.

Referring to FIG. 2, the piston 5 and the lower end 7 of the body 4 delimit a chamber 10 vertically therebetween. Radially, the chamber 10 is delimited by the lateral wall 9 of the body 4 of the pump 1.

In FIG. 1, the piston 5 is in a first position in which the chamber 10 has zero volume. The piston 5 is represented in FIG. 2 in a second position in which the chamber 10 has a positive volume.

When the piston 5 is in the second position, the volume defines a total filling capacity of the chamber 10 and corresponds, in this example, to a volume of about 1,000 µL.

The pump 1 is a piston pump also known as "syringe pump".

Referring to FIG. 1, in this example, the valve 2 is a multi-way rotary valve.

This valve 2 comprises a common dispensing point V0 connected to the chamber 10 of the pump 1 by a first connection duct 15.

FIGS. 1 and 2 show the pump 1, the valve 2 and the duct 15 in the form of distinct elements. Nonetheless, the duct 15 may be moulded in the body of the valve 2 and be connected to the chamber 10 of the pump 1 via a threaded connection (not represented). The common dispensing point V0 is in this case formed by one end of the duct 15. More generally, the pump 1, the valve 2 and the duct 15 may form a single product, such as the product known as the "XCalibur Cavro pump" (registered trademark).

In all cases, the first connection duct 15 is configured to establish a fluidic communication between the common dispensing point V0 and the chamber 10.

In general, the valve 2 should comprise at least one inlet way for introducing liquids into the device and one way connected to the recipient 3. In this minimalist embodiment, the evacuation of the liquids could be carried out through this same inlet way. Nonetheless, it is preferable to introduce the different liquids into the device via respective inlet ways and to evacuate them via a dedicated outlet way. For this reason, it is preferable that the valve 2 comprises at least four ways, i.e. at least two inlet ways, one outlet way, and one way connected to the recipient 3.

In the example of FIG. 1, valve 2 comprises twelve ways V1-V12.

Since the ways V8 to V12 are not used in this example, they are equipped with plugs represented by crosses.

Regardless of the number of ways and the mechanism for changing the position of the valve 2, the latter is configured to be able to be selectively placed in different positions in each of which the common dispensing point V0 and one of said ways V1-V12 are placed in fluidic communication with each other.

The first connection duct 15 is connected to the pump 1 so as to be able to introduce into the chamber 10 or extract therefrom liquids through a low point 16 of the chamber 10.

In this example, the low point 16 of the chamber 10 is located vertically at the lower end 7 of the body 4 of the pump 1.

To this end, the lower end 7 comprises an opening forming this low point 16 and allowing establishing a fluidic communication between the chamber 10 and the first duct 15, and consequently between the chamber 10 and the common dispensing point V0.

Thus, the first connection duct 15 is connected to the pump 1 so as to be able to introduce into the chamber 10 or extract therefrom liquids through the low point 16.

As this could be deduced from the following description, when the chamber 10 is filled with both a volume of air and a volume of liquids that are supposed immiscible, the connection of the first duct 15 at the low point 16 of the pump 1 results in air occupying an upper portion of the chamber 10 and the liquids a lower portion of the chamber 10, so that the volume of liquids is evacuated through first duct 15 before the volume of air.

As regards the recipient 3, the latter comprises a cavity 18 configured to receive liquids.

In the example of FIGS. 1 and 2, the cavity 18 is formed by an opening crossing the recipient 3 there throughout along a longitudinal axis A2.

In the use configuration of the device, this longitudinal axis A2 is in this example substantially parallel to the vertical and to the longitudinal axis A1.

The recipient 3 comprises a body 20 forming a vertically lower end 21 and a vertically upper end 22.

In this example, the opening forming the cavity 18 has a variable section along the axis A2.

Moving along the axis A2 from the upper end 22 down to the lower end 21 of the body 20, the cavity 18 comprises a substantially cylindrical first section 23, a substantially conical second section 24 and a substantially cylindrical third section 25. The diameter of the first section 23 is larger than the diameter of the third section 25.

The first section 23 of the cavity 18 opens onto an outer surface of the upper end 22 of the recipient 3 so that the cavity 18 is exposed to atmospheric pressure, or in any case to the pressure of the environment in which the recipient 3 is placed.

The third section 25 of the cavity 18 opens onto an outer surface of the lower end 21 of the recipient 3, defining a low point 26 of the cavity 18, at least in said use configuration.

In FIGS. 1 and 2, the proportions of the cavity 18 and of each of the other elements of the device are not realistic, these figures are only intended to illustrate the principle of the invention.

Figure 3:
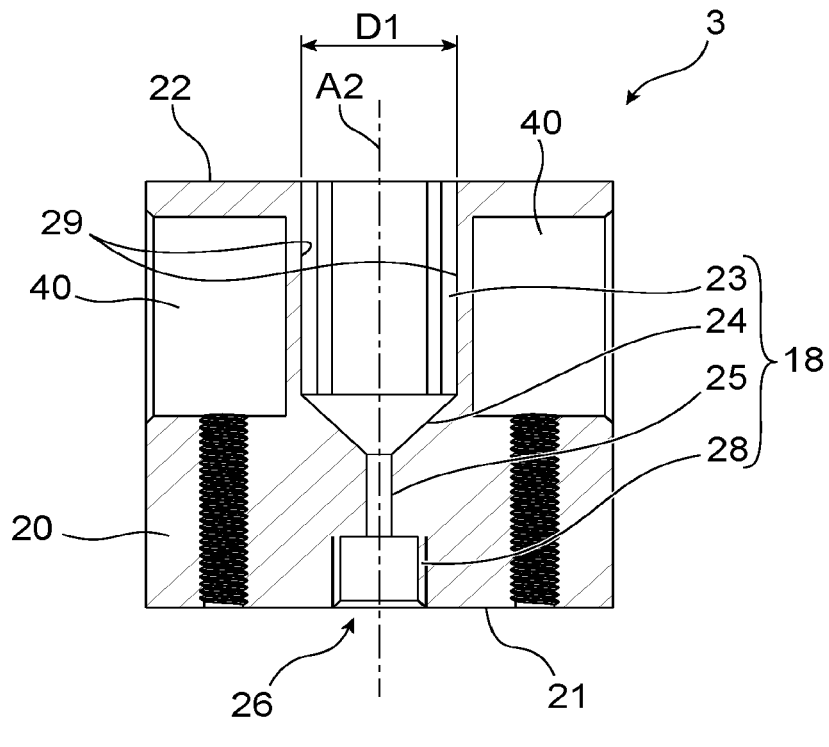
FIG. 3 is a schematic sectional view of a spectrophotometric measuring cell in accordance with the invention.

As a non-limiting example, a recipient 3 actually designed in the context of this invention is shown in FIG. 3.

The recipient 3 of FIG. 3 is a spectrophotometric measuring cell.

The cell 3 of FIG. 3 is only described according to its differences with respect to the recipient 3 of FIG. 1.

The cavity 18 of the cell 3 comprises a fourth substantially cylindrical section 28 opening onto the outer surface of the lower end 21 of the recipient 3, defining said low point 26 of the cavity 18.

The fourth section 28 is configured to cooperate with a duct, via a threaded connection (not represented), in order to convey liquids into the cavity 18 via this duct.

Preferably, the third section 25 has a section having a diameter substantially identical to the inner diameter of such a duct.

The first section 23 is made in the form of a partially cylindrical opening machined so as to form two surfaces 29 parallel to each other and parallel to the longitudinal axis A2.

The surfaces 29 are polished and separated from each other by a distance D1 defining an optical path. In this example, the optical path D1 is 10 mm.

The surfaces 29 are respectively arranged opposite housings 40 intended to receive collimating lenses (not represented) allowing optimising the optical path.

Such a cell 3 allows carrying out spectrophotometric measurements on a mixture of liquids received in the cavity 18 at least in part at the first section 23.

In one embodiment, the recipient 3 of the device of FIGS. 1 and 2 is a spectrophotometric measuring cell such as that one represented in FIG. 3.

Referring to FIG. 1, the device comprises a second duct 27 for connecting the cavity 18 of the recipient 3 to the way V1 of the valve 2, also called transfer way.

When the recipient 3 is the cell of FIG. 3, said duct mentioned hereinabove in the description relating to FIG. 3 consists of this second connection duct 27.

More generally, the second connection duct 27 is configured to establish a fluidic communication between the transfer way V1 of the valve 2 and the cavity 18 of the recipient 3.

The second connection duct 27 is connected to the recipient 3 so as to be able to introduce into the cavity 18 or extract therefrom liquids through said low point 26 of this cavity 18.

In the configuration of FIG. 1 or 2, when the cavity 18 contains liquids, these tend to move towards the second connection duct 27 by the action of the force of gravity F1.

In particular, this configuration allows extracting most or even all of the liquids contained in the cavity 18 via this second connection duct 27.

In the example of FIG. 1, the device comprises five inlet ducts 31-35 and one outlet duct 36.

The inlet ducts 31-35 are respectively connected to the ways V2-V6, called inlet ways, by one of their ends.

In this example, the other end of each of the inlet ducts 31 and 32 is intended to be connected to a sampling point (not represented) so as to establish a fluidic communication between this sampling point and the inlet way V2 or V3 respectively.

In this example, the device comprises four vials 41-44, included three vials 41-43 each containing a respective liquid and one vial 44 intended to receive liquid effluents.

The inlet ducts 33 to 35 are immersed by their other end into the vials 41 to 43, respectively, so as to be able to sample the liquids contained in these vials.

The outlet duct 36 is connected to the way V7, called outlet way, by one of its ends. Its other end is placed in the vial 44 so as to be able to pour liquid effluents therein.

As indicated hereinabove, the valve 2 could be placed in different positions in each of which one of the ways V1 to V12 is set in fluidic communication with the common dispensing point V0.

In particular, the valve 2 could selectively occupy sampling positions each establishing a fluidic communication between a respective one of the inlet ducts 31-35 and the chamber 10 of the pump 1.

Considering the example of the inlet duct 33, the valve 2 could occupy a sampling position establishing a fluidic communication between the way V4 and the dispensing point V0 and therefore between the inlet duct 33 and the chamber 10 of the pump 1. Such a sampling position allows sampling part of the liquid contained in the vial 41 and moving this part of liquid towards the chamber 10 by the action of a movement of the piston 5 in a first direction S1.

The first direction S1 corresponds to a movement of the piston 5 towards the second position illustrated in FIG. 2, from the first position illustrated in FIG. 1 or from an intermediate position (not represented).

The liquids contained in the vials 42 and 43 may be sampled and introduced into the chamber 10 of the pump 1 according to the same principle, respectively via the inlet ducts 34 and 35, by placing the valve 2 in a corresponding sampling position.

A liquid sampling may also be carried out in a similar manner using the inlet duct 31 or 32, for example by immersing the free end of one of these inlet ducts, i.e. the end opposite to that one connected to the valve 2, into a cell (not represented) containing such a liquid, and by placing the valve 2 in a sampling position establishing a fluidic communication between the dispensing point V0 and the way V2 or V3.

Another position of the valve 2, called the transfer position, allows establishing a fluidic communication between the dispensing point V0 and the transfer way V1, and therefore between the chamber 10 of the pump 1 and the cavity 18 of the recipient 3.

Such a transfer position allows moving liquids previously introduced into the chamber 10 from this chamber 10 into the cavity 18 of the recipient 3, via the connection ducts 15 and 27.

For this purpose, the piston 5 of the pump 1 is moved in a second direction S2.

The second direction S2 corresponds to a movement of the piston 5 towards the first position illustrated in FIG. 1, from the second position illustrated in FIG. 2 or from an intermediate position (not represented).

To avoid an overflow of the liquids thus introduced into the cavity 18, the latter forms a volume larger than the total filling capacity of the chamber 10.

The transfer position also allows moving liquids contained in the cavity 18, typically after having introduced them therein according to the principle described hereinabove, from this cavity 18 into the chamber 10 of the pump 1, via the connection ducts 27 and 15, by moving the piston 5 in the first direction S1.

When the valve 2 is in the transfer position, it is thus possible to move liquids according to a back-and-forth movement between the chamber 10 of the pump 1 and the cavity 18 of the recipient 3, in particular in order to mix these liquids and improve the homogeneity of this mixture.

In order to accurately control the movement of the piston 5 and the volume of liquid moved by the piston 5, the pump 1 may include an encoder mounted on its motor (not represented).

Said use configuration of the device is so called because it enables its implementation in particular for mixing liquids. Hence, this configuration enables a movement of liquids from the chamber 10 to the cavity 18 and from the cavity 18 to the chamber 10 when the valve 2 is in the transfer position.

It is obvious that in another configuration in which the recipient 3 would be vertically arranged in the other direction, i.e. with the point 26 forming a high point and not a low point and with the end 22 forming a lower end and not an upper end, the liquids arriving in the cavity 18 through the second duct 27 would be driven out of it by the action of the force of gravity F1 due to opening of the cavity 18 on the outer surface of the end 22 of the recipient 3.

The valve 2 may also be placed in a drain position establishing, in this example, a fluidic communication between the dispensing point V0 and the outlet way V7, and therefore between the chamber 10 of the pump 1 and the outlet duct 36.

Such an emptying position allows evacuating liquids present in the chamber 10 and/or in the first connection duct 15 towards the vial 44, by moving the piston 5 in the second direction S2.

Hence, the device of FIG. 1 forms a mixing device.

As a non-limiting indication, the different ducts 15, 27 and 31-36 may have an outer diameter of about 16 mm and an inner diameter of about 500 μm.

In an embodiment wherein the inlet ducts 31 and/or 32 are intended to sample one or several liquid(s) at a relatively large distance from the valve 2, for example several meters, the inner diameter of these inlet ducts should be increased so as to reduce pressure drops. For example, the inner diameter of the inlet ducts 31 and/or 32 may in this case be equal to 800 μm.

Figure 4:
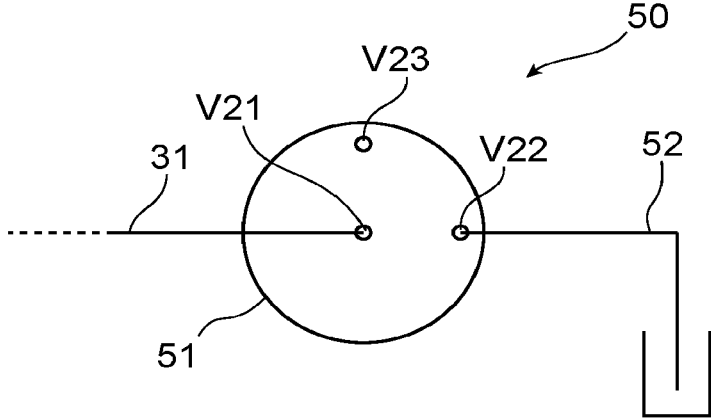
FIG. 4 is a schematic view of a sampling device in accordance with the invention.

FIG. 4 shows a device 50 allowing sampling a relatively small volume of liquid at a relatively large distance.

This sampling device 50 may be connected to the mixing device of FIG. 1 in the manner described hereinafter, or to any other device requiring carrying out such a remote sampling while limiting the volume of sampled liquid.

The device 50 of FIG. 4 comprises a multi-way rotary valve 51 and a sampling duct 52.

In this example, the valve 51 comprises a common dispensing point V21, a sampling way V22 and a way V23 exposed to ambient air, also called open way.

The valve 51 is configured to be able to be selectively placed either in a liquid sampling position in which the dispensing point V21 is set in fluidic communication with the sampling way V22, or in an air sampling position in which the dispensing point V21 is set in fluidic communication with the open way V23.

In this example, the inlet duct 31 of the device of FIG. 1 is connected to the dispensing point V21, by its end opposite to that one connected to the inlet way V2 of the valve 2.

The sampling duct 52 is connected by one of its ends to the sampling way V22. The other end of the duct 52, which is free, is immersed in a liquid to be sampled, at a sampling point located at a relatively close distance from the valve 51 in comparison with the distance separating the valves 2 and 51 from each other. In other words, the length of the inlet duct 31 is much larger than that of the sampling duct 52.

In one embodiment, the device of FIG. 1 comprises one or several magnetic stirrer(s) (not represented) configured to homogenise, before sampling, the liquid(s) respectively contained in one or more of the vials 41 to 43. For example, each stirrer comprises a magnetic bar placed in the bottom of the corresponding vial.

The invention also relates to a physicochemical analysis device comprising on the one hand a detector (not represented), for example of the spectrophotometric type, and on the other hand a mixing device as described hereinabove, the mixing device comprising, or not, one or several sampling device(s) such as the device 50 of FIG. 4.

In one embodiment, the different components forming the mixing device of FIG. 1, and possibly such a detector allowing carrying out measurements on the liquids present in the cavity 18, are integrated into a case (not represented). In one embodiment, this case is made by additive manufacturing.

Generic Example of a Mixing and Analysis Method

The following example aims to illustrate the general principle of operation of the mixing and analysis device described hereinabove, and the implementation of a mixing and analysis method in accordance with the invention.

For this example, it is considered that the device does not initially comprise any liquid in the chamber 10 of the pump 1, in the valve 2, in the cavity 18 of the recipient 3, in the connection ducts 15 and 27, in the inlet ducts 31 to 35, and in the outlet duct 36.

In this example, the vials 41 and 42 respectively comprise first and second liquids.

The following steps are carried out in order.

In the initial state, the piston 5 of the pump 1 is in the first position illustrated in FIG. 1.

The valve 2 is first of all placed in a first sampling position establishing a fluidic communication between the inlet duct 33 and the chamber 10 of the pump 1, via the way V4, the dispensing point V0 and the first connection duct 15.

The piston 5 is moved in the first direction S1.

During a first phase of this movement, the air present in the inlet duct 33 and in the first connection duct 15 progressively penetrates into the chamber 10 and, simultaneously, part of the first liquid present in the vial 41 is sampled by moving in the inlet duct 33 towards the chamber 10 until reaching the end of the duct 15 connected to the pump 1.

During a second phase of the movement of the piston 5 in the first direction S1, the first liquid progressively penetrates the chamber 10.

Upon completion of this second phase, a first volume of the first liquid is present in the chamber 10 and a second volume of the first liquid fills the first connection duct 15.

The movement of the piston 5 is interrupted at least for the time for placing the valve 2 in a second sampling position establishing a fluidic communication between the inlet duct 34 and the chamber 10, via the way V5, the dispensing point V0 and the first connection duct 15.

The movement of the piston 5 could then continue its stroke in the first direction S1 so that, during a third phase of this movement:

said second volume of the first liquid present in the first connection duct 15 progressively penetrates into the chamber 10, followed by the volume of air present in the inlet duct 34 before suction of the second liquid, and simultaneously part of the second liquid present in the vial 42 is sampled by moving in the inlet duct 34 towards the chamber 10 until reaching the end of the duct 15 connected to the pump 1.

During a fourth phase of the movement of the piston 5 in the first direction S1, the second liquid progressively penetrates the chamber 10.

Upon completion of this fourth phase, room 10 comprises:

a volume of air in the upper part, including on the one hand the volume of air initially present in the inlet duct 33 and in the first connection duct 15 and, on the other hand, the volume of air present in the inlet duct 34 before suction of the second liquid, said first and second volumes of the first liquid, a first volume of the second liquid.

A second volume of the second liquid fills the first connection duct 15.

In this example, the piston 5 occupies, upon completion of this fourth phase, the second position illustrated in FIG. 2.

Afterwards, the valve 2 is placed in the transfer position establishing a fluidic communication between the chamber 10 of the pump 1 and the cavity 18 of the recipient 3.

The piston 5 is moved in the second direction S2 so as to convey at least part, preferably all, of the first and second liquids present in the chamber 10 and in the first connection duct 15 up to the cavity 18 of the recipient 3.

In this example, the device is configured so that the volume of air present in the chamber 10 before initiation of this movement, i.e. when the piston 5 is in the second position (FIG. 2), is larger than the capacity of the first connection duct 15 and of the second connection duct 27. Thus, the movement of the piston 5 from the second position (FIG. 2) up to the first position (FIG. 1) allows introducing into the cavity 18 all of the first and second liquids present in the chamber 10 and in the first connection duct 15.

During this movement, which corresponds to a step of filling the recipient 3, the first and second liquids are at least partially mixed. Nonetheless, this mixture could prove to be insufficient to obtain satisfactory homogeneity for the purposes of a spectrophotometric measurement for example.

A mixing step is then carried out by keeping the valve 2 in the transfer position, and by moving the piston 5 according to at least one back-and-forth sequence consisting of a movement of the piston 5 in the first direction S1 and then in the second direction S2.

Such a movement sequence of the piston 5 results in a back-and-forth movement of the liquids between the cavity 18 and the chamber 10.

Thus, it is possible to improve the homogeneity of the solution formed by mixing the first and second liquids.

Of course, the amount of movement of the piston 5 in the first direction S1 and in the second direction S2 during this mixing step, or else the duration between two respective movements of the piston 5, could be adapted according to the nature of the liquids to be mixed and the desired level of homogeneity.

Upon completion of the mixing step, which consequently comprises one or several sequence(s) of back-and-forth movements of the piston 5, the cavity 18 of the recipient 3 contains a mixture of the first and second liquids forming a solution that could undergo a measurement.

In this example, the recipient 3 is a spectrophotometric measuring cell, and the device is programmed so as to carry out, using a spectrophotometric detector and after the mixing step, one or several measurement(s) on this solution.

After such a measuring step, the valve 2 is kept or repositioned in the transfer position, the piston 5 is moved in the first direction S1 so as to convey into the chamber 10 at least part of the liquids contained in the recipient 3.

Afterwards, the valve 2 is placed in the drain position, then the piston 5 is moved to the first position to evacuate the liquids towards the vial 44.

Before carrying out a new measurement on a new combination of the same liquids or other liquids, a rinsing step is preferably carried out using a rinsing liquid sampled, for example, from the vial 43 via the inlet 35, and conveyed to the different portions of the device (chamber 10, cavity 18) then evacuated towards the vial 44 according to the same principles as those that have just been described.

The invention allows carrying out a cycle or a series of cycles comprising a sampling of liquids, mixing thereof, the completion of measurements on the solution formed by the mixed liquids, as well as an analysis based on such measurements, all this in an automated manner, which allows in particular limiting operator intervention and increasing personnel safety.

The invention also allows reducing the volume of the samples necessary for the analyses as well as the volume of the effluents generated by these analyses.

In a non-represented embodiment, the recipient 3 is used only for mixing, and the measurement is carried out within a distinct cell (not represented). For this purpose, after mixing the liquids back-and-forth between the chamber 10 and the cavity 18, the solution thus homogenised is ejected towards such a cell via a dedicated way of the valve 2, for example the way V8.

Remote Sampling Method

In the previous example, the liquids to be mixed are sampled from the vials 41 and 42, these being located at a relatively short distance from the valve 2, i.e. a distance enabling the use of ducts 33 and 34 whose short length as such limits the amount of liquid that should be sampled.

There is described hereinafter, in the context of such a mixing method, the case of sampling at a sampling point located at a relatively long distance, i.e. at a distance requiring the use of a duct with a relatively long length, for example several meters.

The sampling method of the invention allows conveying a liquid over a relatively long distance while reducing the amount of liquid actually sampled.

Unlike the mixing method described hereinabove, said first liquid to be sampled is not contained in the vial 41 but is sampled at a remote sampling point, at which the free end of the duct 52 of the device 50 of FIG. 4 is positioned. The mixing method integrating this remote sampling method is described only by its differences with the mixing method already described hereinabove.

Starting from said initial state, in which the piston 5 is in the first position, the valve 2 is placed in a sampling position establishing a fluidic communication between the inlet duct 31 and the chamber 10, via the way V2, the dispensing point V0 and the first connection duct 15. In turn, the valve 51 is placed in the liquid sampling position establishing a fluidic communication between the inlet duct 31 and the sampling duct 52, via the sampling way V22 and the dispensing point V21. Consequently, the valves 2 and 51 thus positioned establish a fluidic communication between the sampling duct 52 and the chamber 10 of the pump 1.

The piston 5 is moved in the first direction S1.

During a first phase of this movement, the air present in the first connection duct 15, in the inlet duct 31 and in the sampling duct 52 progressively penetrates into the chamber 10 and, simultaneously, part of the first liquid located at said sampling point is sampled by moving through the sampling duct 52 then through the inlet duct 31 towards the chamber 10.

The movement of the piston 5 is interrupted at least for the time for placing the valve 51 in the air sampling position establishing a fluidic communication between the open way V23 and the inlet duct 31. The valve 2 is kept in the sampling position described hereinabove.

During a second phase of the movement of the piston 5 in the first direction S1, air penetrates in the inlet duct 31 via the open way V23 whereas the first liquid continues to be moved in the inlet duct 31 then in the first connection duct 15 in the direction of the chamber 10.

Hence, the principle of this sampling process consists in sampling a reduced amount of liquid and conveying it in a duct between two volumes of air.

In general, the arrival of the first liquid sampled at the valve 2, in this example at the way V2, could be determined by calculation and/or detected by a sensor (not represented).

Depending on the length of the inlet duct 31, intermediate air purges may prove necessary to convey the first liquid thus sampled into the chamber 10 of the pump 1.

An intermediate air purge may be carried out by placing the valve 2 in the drain position or possibly in a purge position setting the first connection duct 15 in fluidic communication with a dedicated way such as the way V12.

After such a positioning of the valve 2, the piston 5 is moved in the second direction S2 to evacuate part of the air contained in the first connection duct 15 and the chamber 10. Afterwards, the valve 2 is set back to the sampling position described hereinabove, then the piston 5 is moved in the first direction S1 to continue the delivery of the first liquid towards the chamber 10.

The introduction into the chamber 10 of the first liquid then of the second liquid, as well as mixing thereof, may then be carried out as described hereinabove.

The remote sampling method may also be implemented in the context of other applications, for example to sample a liquid sample and analyse this sample without mixing it with other liquids.

Example of Implementation for a pH Measurement

A particular example of implementation of the mixing device of FIG. 1 is described hereinbelow, for measuring the pH of an acidic aqueous solution.

The vials 41, 42 and 43 respectively contain a solution of sodium oxalate, a solution of a pH-sensitive dye and a rinsing liquid such as an aqueous solution of a weak acid.

The initial conditions are as follows. The ducts 33, 34 and 35 are filled with the corresponding solutions and the other elements of the device are rinsed and exposed to ambient air.

A first sequence consists in preparing a sample of the acidic aqueous solution for analysis thereof.

For this purpose, an operator immerses the free end of duct 31 in a jug (not represented) containing the acidic aqueous solution. The valve 2 is positioned so as to set the dispensing point V0 and the way V2 in fluidic communication, and the piston 5 is moved in the first direction S1 in order to draw a volume of sample equivalent to the volume of the duct 31, as well as a 20 μL extra for rinsing. The valve 2 is positioned so as to set the dispensing point V0 and the way V1 in fluidic communication, and the piston 5 continues its stroke up to the second position (maximum high position) in order to suck in as much air as possible. Afterwards, the valve 2 is positioned so as to set the dispensing point V0 and the way V7 in fluidic communication, and the piston 5 is moved in the second direction S2 up to the first position (maximum low position) in order to push the 20 μL extra sample to effluents.

A second sequence consists in rinsing the device with the sodium oxalate solution used as the main reactive medium.

To this end, the valve 2 is positioned so as to set the dispensing point V0 and the way V4 in fluidic communication, and the piston 5 is moved in the first direction S1 in order to draw a volume of 200 μL of the sodium oxalate solution. The valve 2 is positioned so as to set the dispensing point V0 and the way V1 in fluidic communication, and the piston 5 continues its stroke up to the maximum high position in order to suck in as much air as possible. Afterwards, the piston 5 is moved to the maximum low position in order to send the 200 μL of sodium oxalate solution into the cavity 18 of the recipient 3, then again to the maximum high position in order to return the 200 μL of oxalate solution of sodium into the chamber 10 of the pump 1. Afterwards, the valve 2 is positioned so as to set the dispensing point V0 and the way V7 in fluidic communication, and the piston 5 is moved in the maximum low position in order to push the 200 μL of sodium oxalate solution which have allowed pre-rinsing in the majority medium of the analysis to come.

A third sequence consists in sampling defined volumes of the sodium oxalate solution, the dye solution and the sample. In the context of this third sequence, one or several additional pre-rinse(s) may be carried out as described hereinabove, with different volumes of the sodium oxalate solution, for example a first additional pre-rinse with a volume of 1,000 μL of the sodium oxalate solution and a second additional pre-rinse with a volume of 200 μL of the sodium oxalate solution.

To carry out the samples, the valve 2 is positioned so as to set the dispensing point V0 and the way V4 in fluidic communication, and the piston 5 is moved in the first direction S1 in order to draw a volume of 790 μL of the sodium oxalate solution.

Afterwards, the valve 2 is positioned so as to set the dispensing point V0 and the way V5 in fluidic communication, and the piston 5 continues its stroke in the first direction S1 in order to draw a volume of 100 μL of the dye solution.

Afterwards, the valve 2 is positioned so as to set the dispensing point V0 and the way V2 in fluidic communication, and the piston 5 continues its stroke in the first direction S1 in order to draw a volume of 10 μL of sample.

A fourth sequence consists in mixing the liquids thus sampled.

For this purpose, the valve 2 is positioned so as to set the dispensing point V0 and the way V1 in fluidic communication, and the piston 5 continues its stroke in the first direction S1 until it reaches its maximum high position in order to suck in as much air as possible. Afterwards, the piston 5 is moved to the maximum low position in order to send the 900 μL of the mixture into the cavity 18, then to the maximum high position in order to return the 900 μL of the mixture into the chamber 10, then again to the maximum low position in order to return the 900 μL of the mixture into the cavity 18.

A fifth sequence consists in analysing the mixture present in the cavity 18 of the recipient 3. In this example, the recipient 3 is a spectrophotometric measuring cell. A raw spectrum acquisition is carried out on the solution present in the cavity 18 of the cell 3.

In a manner known per se, a set of calculations taking this acquisition into account, as well as the standards made before and the involved volumes allow deducing the pH of the sample.

A sixth sequence consists in evacuating the mixture towards the vial 44 intended to receive the effluents. For this purpose, the piston 5 is moved to the maximum high position in order to introduce the 900 μL of the mixture into the chamber 10. Afterwards, the valve 2 is positioned so as to set the dispensing point V0 and the way V7 in fluidic communication, and the piston 5 is moved to the maximum low position in order to push the 900 μL of solution towards the effluents.

A seventh sequence consists in rinsing the device with a weak acid. For this purpose, the valve 2 is positioned so as to set the dispensing point V0 and the way V6 in fluidic communication, and the piston 5 is moved in the first direction S1 in order to draw a volume of 200 μL of the weak acid solution. Afterwards, the valve 2 is positioned so as to set the dispensing point V0 and the way V1 in fluidic communication, and the piston 5 is moved to the maximum high position in order to suck in as much air as possible, then to the maximum low position in order to send the 200 μL of weak acid into the cavity 18, then again in the maximum high position in order to return the 200 μL of weak acid into chamber 10. Afterwards, the valve 2 is positioned so as to set the dispensing point V0 and the way V7 in fluidic communication, and the piston 5 is moved to the maximum low position in order to evacuate the 200 μL of weak acid which have allowed rinsing.

One or several additional rinse(s) may be carried out as described hereinabove, with different volumes of the weak acid solution, for example a first additional rinse with a volume of 1,000 μL of the weak acid solution and a second additional rinse with a volume of 200 μL of the weak acid solution.

An eighth sequence consists in returning the extra sample into the jug. For this purpose, the valve 2 is positioned so as to set the dispensing point V0 and the way V1 in fluidic communication, and the piston 5 is moved towards the maximum high position in order to suck in a volume of air corresponding to the volume of the duct 31 plus a 20 μL margin. Afterwards, the valve 2 is positioned so as to set the dispensing point V0 and the way V2 in fluidic communication, and the piston 5 is moved to the maximum low position in order to push the air into the duct 31 and thus return the unused sample into the jug.

The invention claimed is:

1. A device for mixing liquids, the device comprising:
a piston pump;
a multi-way valve;
a recipient;
a first duct for connecting the multi-way valve to a chamber of the pump;
a second duct for connecting a cavity of the recipient to a transfer way of the multi-way valve;
a plurality of inlet ducts; and
a sampling device,
wherein each of the inlet ducts is connected to a respective inlet way of the multi-way valve, the multi-way valve being able to selectively occupy:
sampling positions each establishing a fluidic communication between respective one of the inlet ducts and the chamber so as to be able to move a respective one of the liquids from the inlet duct towards the chamber by the action of a movement of the piston in a first direction, and
a transfer position establishing a fluidic communication between the chamber and the cavity so as to be able to move the liquids, via the first duct and the second duct, from the chamber to the cavity by the action of a movement of the piston in a second direction and from the cavity to the chamber by the action of a movement of the piston in the first direction,
wherein at least in one use configuration of the device, the cavity defines a cavity low point and wherein the second duct is connected to the recipient so as to be able to introduce into the cavity or extract therefrom the liquids through the cavity low point,
wherein the multi-way valve is a main valve, and
wherein the sampling device includes a sampling valve and a sampling duct connected to a sampling way of the sampling valve, the sampling valve being able to selectively occupy:

a liquid sampling position establishing a fluidic communication between the sampling duct and a first one of the inlet ducts connected to the respective inlet way of the multi-way valve so as to be able to move the liquid from the sampling duct towards the chamber by the action of a movement of the piston in the first direction when the main valve is in a first sampling position establishing a fluidic communication between the first one of the inlet ducts and the chamber, and
an air sampling position establishing a fluidic communication between an open way of the sampling valve and the first one of the inlet ducts connected to the respective inlet way of the multi-way valve, the open way being exposed to surrounding air, so as to be able to move the surrounding air towards the chamber by the action of a movement of the piston in the first direction when the main valve is in the first sampling position.

2. The mixing device according to claim 1, wherein the cavity is open at one end of the recipient opposite to the cavity low point.

3. The mixing device according to claim 2, wherein the cavity has a section narrowing towards the cavity low point.

4. The mixing device according to claim 1, wherein, at least when the device is in the one use configuration, the chamber defines a chamber low point and the first duct is connected to the pump so as to be able to introduce into the chamber or extract therefrom the liquids through the chamber low point.

5. The mixing device according to claim 1, wherein the recipient is a spectrophotometric measuring cell.

6. An analysis device for the physicochemical analysis of a liquid, the analysis device comprising a mixing device according to claim 1.

7. The analysis device according to claim 6, the analysis device comprising a spectrophotometric detector.

8. A method for mixing liquids using a mixing device according to claim 1, the method comprising:
a sampling step in which the liquids are respectively moved from the inlet ducts towards the chamber of the pump, the sampling step comprising positioning the multi-way valve in the respective sampling positions,
a step of filling the recipient comprising moving at least part of the liquids from the chamber to the cavity, the step comprising positioning the multi-way valve in the transfer position, and
a mixing step comprising moving the at least part of the liquids from the cavity to the chamber then from the chamber to the cavity.

9. A method for physicochemical analysis of a liquid, the analysis method including the mixing method according to claim 8.

\* \* \* \* \*